US006331706B1

(12) United States Patent
Orr et al.

(10) Patent No.: US 6,331,706 B1

(45) Date of Patent: Dec. 18, 2001

(54) COLLECTION OF IONS

(75) Inventors: Christopher Henry Orr; Craig Janson Luff; Thomas Dockray, all of Calderbridge (GB); Duncan Whittemore Macarthur, Los Alamos, NM (US); John Alan Bounds, Los Alamos, NM (US); James E. Koster, Los Alamos, NM (US)

(73) Assignees: British Nuclear Fuels PLC, Cheshire (GB); The Regents of the University of California, Oakland, CA (US)

( * ) Notice: Subject to any disclaimer, the term of this patent is extended or adjusted under 35 U.S.C. 154(b) by 0 days.

(21) Appl. No.: 09/307,371

(22) Filed: May 7, 1999

(30) Foreign Application Priority Data

May 8, 1998 (GB) ..................................................... 9809756

(51) Int. Cl.[7] ..................................................... G01T 1/18

(52) U.S. Cl. ................................ 250/385.1; 250/370.01; 250/376

(58) Field of Search ............................ 250/385.1, 370.01, 250/376, 374

(56) References Cited

U.S. PATENT DOCUMENTS

| | | | |
|---|---|---|---|
| 4,788,430 * | 11/1988 | Gonthier | 250/376 |
| 4,814,608 | 3/1989 | Dempsey et al. | 250/253 |
| 4,853,536 | 8/1989 | Dempsey et al. | 250/253 |
| 4,970,391 * | 11/1990 | Uber, III | 250/374 |
| 4,992,658 | 2/1991 | Ramsey et al. | 250/253 |
| 5,008,540 | 4/1991 | Dempsey | 250/336.1 |
| 5,055,674 | 10/1991 | Kotrappa | 250/255 |
| 5,059,803 | 10/1991 | Kronenberg | 250/385.1 |
| 5,107,108 | 4/1992 | Ramsey et al. | 250/253 |
| 5,126,567 | 6/1992 | Dempsey et al. | 250/336.1 |
| 5,128,540 | 7/1992 | Stieff | 250/255 |
| 5,184,019 | 2/1993 | MacArthur et al. | 250/380 |
| 5,187,370 | 2/1993 | MacArthur et al. | 250/379 |
| 5,194,737 | 3/1993 | MacArthur et al. | 250/382 |
| 5,281,824 | 1/1994 | MacArthur et al. | 250/380 |
| 5,311,025 | 5/1994 | MacArthur et al. | 250/374 |
| 5,514,872 | 5/1996 | Bolton et al. | 250/380 |
| 5,525,804 | 6/1996 | MacArthur et al. | 250/374 |
| 5,550,381 | 8/1996 | Bolton et al. | 250/380 |
| 5,663,567 | 9/1997 | Steadman et al. | 250/382 |
| 5,679,958 | 10/1997 | MacArthur | 250/382 |
| 5,877,502 | 3/1999 | Koster et al. | 250/382 |

FOREIGN PATENT DOCUMENTS

| | | | |
|---|---|---|---|
| WO 98/38531 | 9/1998 | (WO) | 1/185 |

* cited by examiner

*Primary Examiner*—Constantine Hannaher
*Assistant Examiner*—Otilia Gabor
(74) *Attorney, Agent, or Firm*—Workman, Nydegger & Seeley

(57) ABSTRACT

The apparatus and method provide an improved technique for detecting ions as the area from which ions are attracted to a detector is increased, consequently increasing the number of ions detected. This is achieved by providing the outer electrodes of the detector connected to the electrical potential, together with alternate intermediate electrodes. The other intermediate electrodes and preferably the housing are grounded.

The technique renders such detection techniques more sensitive and gives them a lower threshold at which they can function.

14 Claims, 2 Drawing Sheets

COLLECTION OF IONS

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of CRADA No. LA96C10298 and Contract No. W-7405-ENG-36 awarded by the U.S. Department of Energy.

BACKGROUND OF THE INVENTION

1. Field of the Invention

This invention concerns improvements in and relating to ion detection, particularly, but not exclusively to the detection of ions produced by the passage of alpha particles through a medium, such as a gas.

2. Present State of the Art

Alpha particles are only directly detectable a short distance from their source. As a consequence of this longer range detection techniques have been developed based on the ions produced in the air during the passage of alpha particles. These ions are electrostatically attracted towards a detection location and/or forced towards such a detection location by the flow of air within the apparatus. Once within the detector unit, the electric field existing between electrodes and/or between electrodes and the apparatus attracts ions of one polarity. The current arising can subsequently be measured and the level of alpha contamination present be determined from this current.

The number of ions produced is relatively low and as a consequence the currents arising are relatively low. Because of the low signal level, these signals are prone to interference from background noise and are also close to the practical level detectable in certain circumstances. It is therefore desirable to maximise the number of ions actually detected by the apparatus so as to obtain the strongest signal possible.

BRIEF SUMMARY AND OBJECTS OF THE INVENTION

The present invention aims to provide an apparatus and method of detection whereby the maximum number of ions possible are detected due to the increased effective area of detection unit employed.

According to a first aspect of the invention we provide apparatus for detecting ions, the apparatus comprising a plurality of electrodes, the electrodes being spaced from one another and configured with a first outlet electrode and a second outer electrode and an odd number of intermediate electrodes provided there between, the outer electrodes and alternate intermediate electrodes being electrically connected to a source of electrical potential and to current measuring means, the electrode(s) adjacent the outer electrodes and other alternate electrodes being grounded.

Preferably the plurality of electrodes are provided within a housing. Preferably the housing is grounded. Preferably the housing is electrically conductive.

The housing may comprise an elongate chamber. The housing may have a circular or rectilinear cross-section. The housing may be provided with an inlet and an outlet, the electrodes being provided between the inlet and the outlet.

The housing may be provided with medium, such as fluid flow generating and/or assisting means, preferably to cause medium flow from an inlet to an outlet. The medium flow may be assisted or generated by a fan. Preferably the fluid is a gas.

One or more discrete flow paths over a surface or surfaces of the item or a location may be provided. A pipe, for instance, may have an external flow path separated from an internal flow path by the material forming the pipe. Preferably means are provided for regulating the medium flow along one or more of the discrete paths. Detection of ion generating sources on or in one more of the discrete paths alone may be provided by obscuring or inhibiting one or more of the other flow paths. Sealing means may be provided to inhibit flow along one or more of the flow paths, most preferably in a selective manner. Inflatable seals and/or iris seals and/or aperture seals may be provided.

The ions may be generated by the passage of alpha particles and/or beta particles. The apparatus may be used to monitor alpha and/or beta contamination on an item or location. The items(s) to be monitored may be or include tools, pipes, pumps, filters, cables, rods and the like. The location may include surfaces in general, such as floors, walls, ceilings, soil, rubble, material on a conveyor, and include parts of, or surfaces of items, such as glove boxes, tanks, vessels and the like.

Preferably the item or location is provided at a monitoring location relative to the electrodes. The monitoring location is preferably upstream, in flow, relative to the electrodes. Preferably the item is mounted or supported so as to maximise the surface area exposed to the flow.

The apparatus may be provided with one or two plates, but is preferably provided with at least three electrodes. Preferably at least five, and more preferably at least seven electrodes are provided. The apparatus may be provided with less than 15 and more preferably less than 11 electrodes.

One or more, and preferably all, of the electrodes may be planar. Preferably the electrodes are provided parallel to one another. Preferably the electrodes are provided in opposition, an outer electrode being opposed by one electrode, an intermediate electrode being opposed by two electrodes. The spacing between the electrodes is preferably the same between each pair of opposing electrodes. The spacing between the outer electrodes and the housing is preferably the same as between opposing electrodes.

The electrodes may be continuous, such as a plate, or discontinuous, such as a grid.

Preferably the electrodes define an active area, ions entering the active area being attracted towards one or more electrodes. Preferably the active area extends between all of the electrodes. Preferably the active area extends between the outer electrodes and the opposing parts of the housing. Preferably the active area extends between the edges of the electrodes and the parts of the housing opposing those edges. It is particularly preferred that the active area extent across the entire cross-section of the housing, preferably considered perpendicular to the direction of airflow.

The electrodes are preferably arranged parallel to the direction of airflow. Preferably the airflow passes through the spacing between the electrodes.

The electrical potential is preferably provided by an external power source. Potentials of between 10V and 1000V or even 10000V may be provided.

Preferably a single current measuring means is used. Preferably the combined current of all the electrodes connected to the current measuring means is measured. An electrometer, and most preferably a floating point electrometer is preferred for this purpose.

According to a second aspect of the invention we provide a method for detecting ions, the method comprising:

introducing the ions to a detector unit, the detector unit comprising a plurality of electrodes, the electrodes being spaced from one another and configured with a first outer electrode and a second outer electrode and an odd number of intermediate electrodes provided there between;

applying an electrical potential to the outer electrodes and alternate intermediate electrodes and measuring the current passaging through the outer electrodes and alternate intermediate electrodes; and grounding the electrode(s) adjacent the outer electrodes and other alternate intermediate electrodes and/or those electrodes not connected to the electrical potential source.

Preferably the plurality of electrodes are provided within a housing and the method includes grounding the housing.

The method may include provided an air flow to convey ions into proximity with the electrodes.

The method may be used for detecting ions generated by the passage of alpha particles. The method may be used to monitor alpha contamination on an item or location.

The other options, possibilities, features and details provided elsewhere in the application are equally applicable to the method.

BRIEF DESCRIPTION OF THE DRAWINGS

Various embodiments of the invention will now be described, by way of example only, and with reference to the accompanying drawings in which.

DETAILED DESCRIPTION OF THE PREFERRED EMBODIMENT

The detection of alpha particles emitted into air from an item is possible through indirect means. Despite the fact that alpha particles only travel a few centimetres in air, and as a consequence cannot be detected directly at any distance from their source, during the course of their travel through the air they cause ionisation of a significant number of air molecules. As these ionised molecules remain in that state for a sufficient period of time they can be detected remote from the alpha source.

Figure 1:
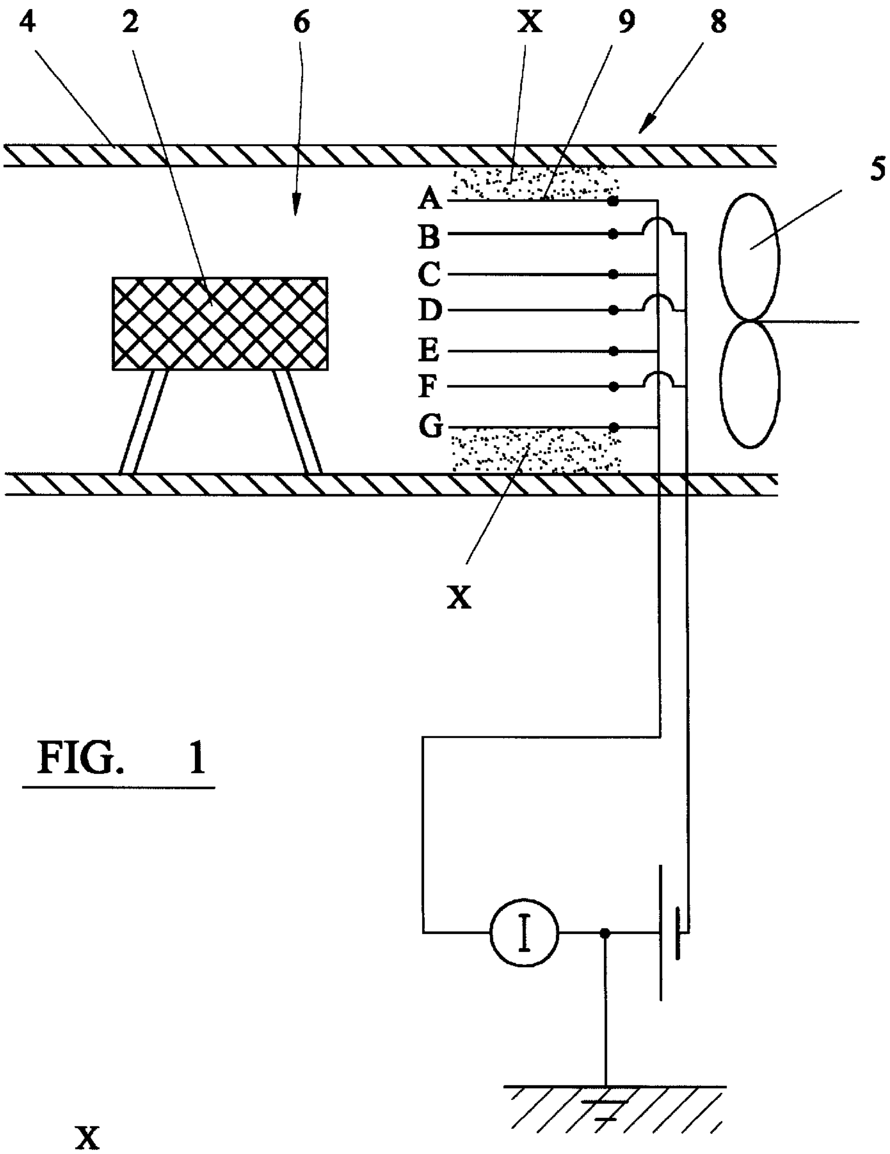
FIG. 1 illustrates a prior art alpha particle monitoring instrument, including a detector array, in sectioned side view.

Alpha detection based on this principle is possible using an instrument of the type illustrated in FIG. 1. An item 2 to be monitored is enclosed within a container 4 so as to define a measuring chamber 6. The container 4 is provided with a fan 5 for drawing air through the instrument so as to convey ions from their source near the item 2 to the detector array 8. The detector array 8 consists of a series of parallel plates 9 of electrically conducting material.

An odd number of plates 9 are provided. A voltage source is connected to the inner/even plates B, D, F and an electrometer, ground referenced, is connected to the outer/odd plates A, C, E, G. By applying an electrical potential to the inner plates, ions of one polarity present within the volume are repelled from them to all nearby surfaces, including the alternating plates and all other grounded surfaces in the instrument, including the instrument walls. The ions reaching the alternating plates are detected by the electrometer and are indicative of the level of ions and hence level of alpha emissions occuring within the chamber 6.

Figure 2:
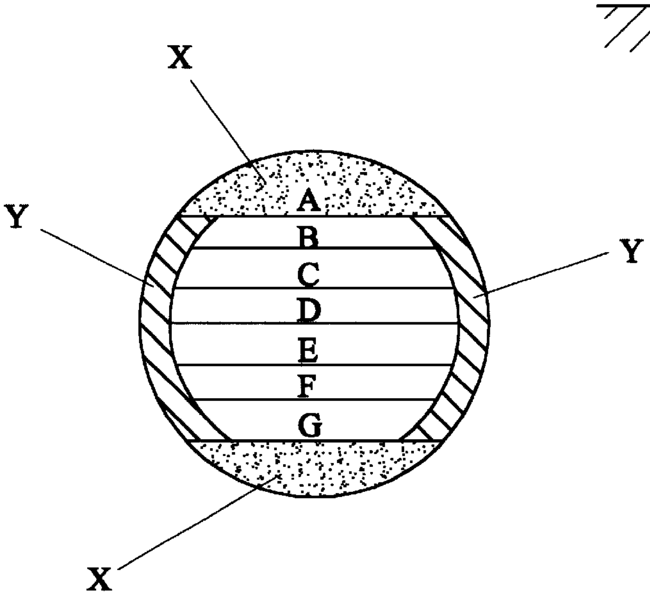
FIG. 2 illustrates the instrument of FIG. 1 in cross-section.

The efficiency of this detector array is impaired as whilst ions entering region between the outermost plates take part in the detection, those entering the space between the outer plates and the walls of the chamber, dot shaded zone X in FIG. 1 and FIG. 2, cannot be detected. Additionally the repulsion effect results in those ions entering the space between the plates and the instrument walls all around the instrument, cross-hatched zone Y in FIG. 2, also being lost to the grounded walls of the instrument. A significant number of ions produced by alpha emissions are therefore not used in the detection.

Figure 3:
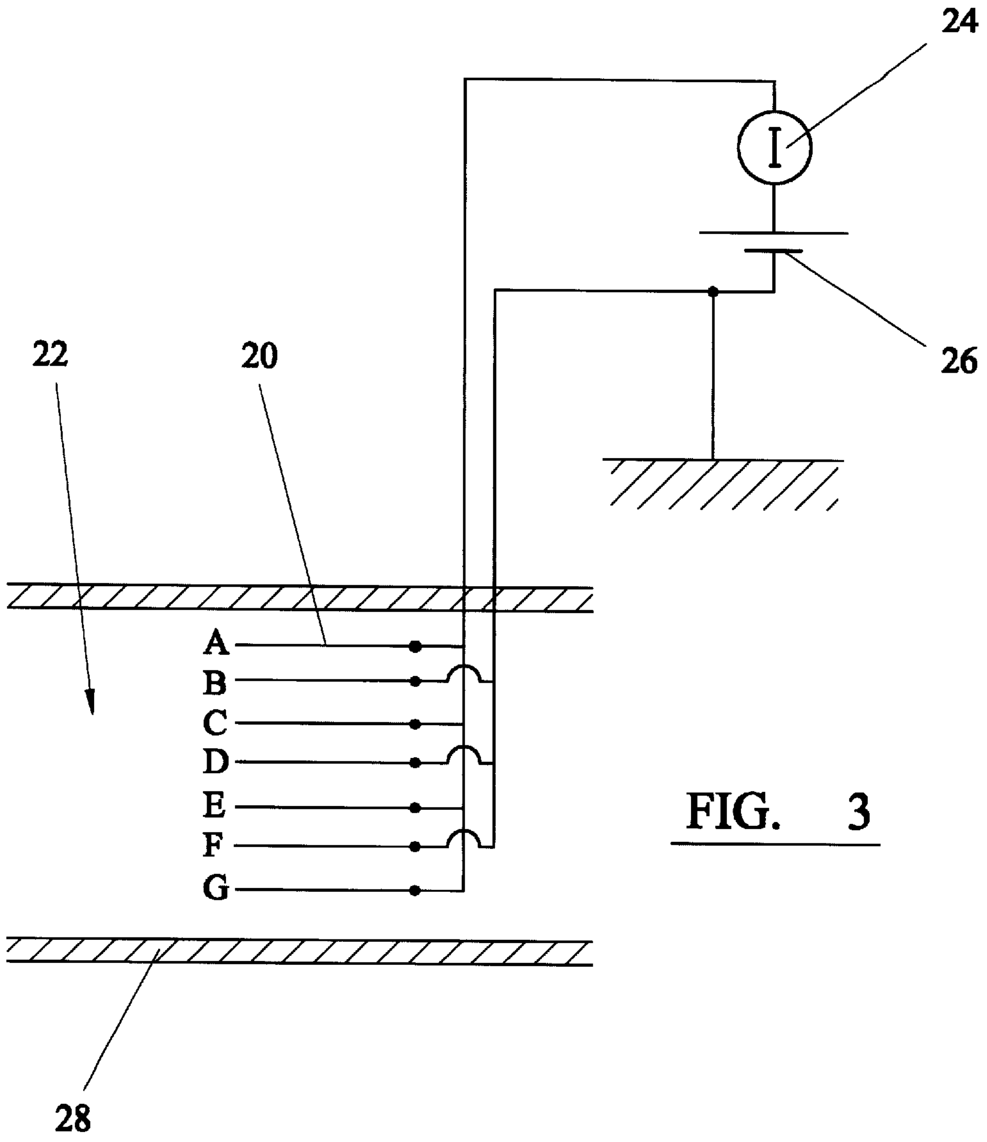
FIG. 3 illustrates a detector array according to a first embodiment of the present invention, in sectioned side view.
Figure 4:
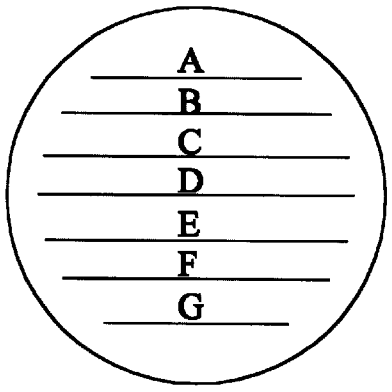
FIG. 4 illustrates the detector array of FIG. 3 in cross-section.

In the embodiment of the invention illustrated in FIGS. 3 and 4 the active area for detection is maximised and the detection efficiency is increased as a result. The variables present in the prior art detector due to the edge effects are also avoided giving more consistent results.

The detector array comprises an odd number of plates 20 spanning the width and depth of the measuring chamber 22. The outer plates A, G and the odd intervening plates C, E are connected to both the electrometer 24 and to the high voltage potential 26. Due to the structure employed a floating point electrometer is employed. The inner, even, plates B, D, F are all grounded as is the chamber wall 28.

As a consequence of this configuration all ions, which ever path they take past the detector plates 20, can participate in the detection current through attraction to the outer/odd plates and subsequent generation of a measured current. Improved levels in the typically $10^{-12}$A currents encountered in such detectors are achieved as a result.

The positions of the potential source and electrometer can be reversed.

The system offers increased efficiency and sensitivity through its use of the vase majority of ions produced by the alpha emissions in the detection signal.

The system also avoids the less predictable fringe effects from which the prior art suffers. These effects would otherwise introduce variation between runs of the instrument due to variation in the position of components of the apparatus and the resultant variation in the level of ions escaping to ground, an effect which cannot be quantified.

The system may also be provided with means for monitoring beta and/or gamma emission sources in conjunction with the item or location.

What is claimed is:

1. Apparatus for detecting ions, the apparatus comprising a plurality of electrodes, the electrodes being spaced from one another and configured with a first outer electrode and a second outer electrode and an odd number of intermediate electrodes provided there between, the outer electrodes and alternate intermediate electrodes being electrically connected to a source of electrical potential and to current measuring means, the electrode(s) adjacent the outer electrodes and other alternate electrodes being grounded.

2. Apparatus according to claim 1 in which the plurality of electrodes are provided within a housing, the housing is electrically conductive, and the housing is grounded.

3. Apparatus according to claim 1 in which the electrodes define an active area, ions entering the active area being attracted towards one or more electrodes, the active area extending between all of the electrodes.

4. Apparatus according to claim 3 in which the active area extends between the outer electrodes and the opposing parts of the housing.

5. Apparatus according to claim 4 in which the active area extends between the edges of the electrodes and the parts of the housing opposing those edges.

6. Apparatus according to claim 1 in which the apparatus is provided with at least five electrodes.

7. Apparatus according to claim 1 in which the electrodes are planar and are provided parallel to one another, each electrode being disposed in a discrete plane.

8. Apparatus according to claim 1 in which the electrodes are provided in opposition, an outer electrode being opposed by one electrode, an intermediate electrode being opposed by two electrodes.

9. Apparatus according to claim 1 in which the spacing between the electrodes is the same between each pair of opposing electrodes and the spacing between the outer electrodes and the housing is the same as between opposing electrodes.

10. An apparatus as recited in claim 1, wherein the outer electrodes and alternate intermediate electrodes are electrically connected directly to the source of electrical potential.

11. A method for detecting ions, the method comprising:

introducing the ions to a detector unit, the detector unit comprising a plurality of electrodes, the electrodes being spaced from one another and configured with a first outer electrode and a second outer electrode and an odd number of intermediate electrodes provided there between;

applying an electrical potential to the outer electrodes and alternate intermediate electrodes and measuring the current passing through the outer electrodes and alternate intermediate electrodes; and grounding the electrode(s) adjacent the outer electrodes and other alternate intermediate electrodes and/or those electrodes not connected to the electrical potential source.

12. A method according to claim 11 in which the method includes provided an air flow to convey ions into proximity with the electrodes.

13. A method according to claim 11 in which the method is used for detecting ions generated by the passage of alpha particles.

14. Apparatus for detecting ions, the apparatus comprising a plurality of substantially planar electrodes stacked in spaced apart substantially parallel alignment, the planar electrodes comprising:

a first outer electrode, a second outer electrode, and an intermediate electrode disposed therebetween, the first outer electrode, second outer electrode, and intermediate electrode each being electrically connected directly to a source of electrical potential and connected to a current measurer;

a first ground electrode disposed between the first outer electrode and the intermediate electrode; and a second ground electrode disposed between second outer electrode and the intermediate electrode, the first ground electrode and the second ground electrode each being grounded.

* * * * *

UNITED STATES PATENT AND TRADEMARK OFFICE

CERTIFICATE OF CORRECTION

PATENT NO. : 6,331,706 B1

DATED : December 18, 2001

INVENTOR(S) : Christopher Henry Orr et al.

It is certified that error appears in the above-identified patent and that said Letters Patent is hereby corrected as shown below:

Column 1,
Line 22, after "this" insert -- , --
Line 52, after "first" change "outlet" to -- outer --

Column 3,
Line 22, after "include" change "provided" to -- providing --
Line 28, before "application" change "the" to -- this --

Column 4,
Line 11, before "region" insert -- the --

Column 6,
Line 10, after "includes" change "provided" to -- providing --

Signed and Sealed this

Eighteenth Day of February, 2003

JAMES E. ROGAN
*Director of the United States Patent and Trademark Office*